United States Patent [19]
Hoffman et al.

[11] Patent Number: 6,012,039
[45] Date of Patent: Jan. 4, 2000

[54] TOKENLESS BIOMETRIC ELECTRONIC REWARDS SYSTEM

[75] Inventors: Ned Hoffman, Sebastopol; David Ferrin Pare, Jr., Berkeley; Jonathan Alexander Lee, Oakland, all of Calif.

[73] Assignee: SmartTouch, Inc., Berkeley, Calif.

[21] Appl. No.: 09/244,784

[22] Filed: Feb. 5, 1999

Related U.S. Application Data

[63] Continuation of application No. 08/705,399, Aug. 29, 1996, Pat. No. 5,870,723, which is a continuation-in-part of application No. 08/442,895, May 17, 1995, Pat. No. 5,613,012, which is a continuation-in-part of application No. 08/345,523, Nov. 28, 1994, Pat. No. 5,615,277.

[51] Int. Cl.[7] ............................. G06F 17/60; G06K 9/00
[52] U.S. Cl. ............................ 705/14; 705/44; 380/23; 382/115
[58] Field of Search ........................... 705/14, 26, 35, 705/39, 44; 380/23, 24, 25, 49; 382/115, 116, 117, 118, 119, 124, 128; 235/375, 380, 381, 382, 382.5

[56] References Cited

U.S. PATENT DOCUMENTS

| | | | |
|---|---|---|---|
| 4,995,086 | 2/1991 | Lilley et al. | 382/124 |
| 4,998,279 | 3/1991 | Weiss | 380/23 |
| 5,036,461 | 7/1991 | Elliott et al. | 705/44 |
| 5,210,588 | 5/1993 | Lee | 356/71 |
| 5,222,152 | 6/1993 | Fishbine et al. | 382/127 |
| 5,229,764 | 7/1993 | Matchett et al. | 340/825.34 |
| 5,230,025 | 7/1993 | Fishbine et al. | 382/127 |
| 5,280,527 | 1/1994 | Gullman et al. | 380/23 |
| 5,321,242 | 6/1994 | Heath, Jr. | 235/382 |
| 5,325,442 | 6/1994 | Knapp | 382/124 |
| 5,335,288 | 8/1994 | Faulkner | 382/115 |
| 5,343,529 | 8/1994 | Goldfine et al. | 380/23 |
| 5,351,303 | 9/1994 | Willmore | 382/115 |

*Primary Examiner*—James P. Trammell
*Assistant Examiner*—Demetra R. Smith
*Attorney, Agent, or Firm*—Ali Kamarei

[57] ABSTRACT

The method of the invention includes a tokenless authorization of a reward transaction between an issuer and a recipient using an electronic identicator and at least one recipient bid biometric sample, the method comprising the following steps. A recipient registration step, wherein a recipient registers with an electronic identicator at least one registration biometric sample. An issuer registration step, wherein the issuer registers identification data with the electronic identicator. During a transaction formation step, wherein an electronic reward transaction is formed between the issuer and the recipient, comprising issuer bid identification data, transaction data, and at least one recipient bid biometric sample, the bid biometric sample is obtained from the issuer's person. In at least one transmission step, the issuer bid identification data, the transaction data, and recipient bid biometric sample are electronically forwarded to the electronic identicator. In a recipient identification step, the electronic identicator compares the bid biometric sample with at least one registered biometric sample for producing either a successful or failed identification of the recipient. In an issuer identification step, the electronic identicator compares the issuer's bid identification data with an issuer's registered identification data for producing either a successful or failed identification of the issuer. Thereby, upon successful identification of the recipient and issuer, a reward transaction is authorized for debit or credit settlement of reward units from the recipient's rewards account, without the recipient presenting any personalized man-made tokens such as smartcards or magnetic swipe cards.

20 Claims, 4 Drawing Sheets

TOKENLESS BIOMETRIC ELECTRONIC REWARDS SYSTEM

CROSS REFERENCE

This application is a continuation of application Ser. No. 07/705,399, filed on Aug. 29, 1996 now U.S. Pat. No. 5,870,723, which is a continuation-in-part of U.S. application Ser. No. 08/442,895 filed on May 17, 1995 now U.S. Pat. No. 5,613,012 which is a continuation-in-part of U.S. application Ser. No. 08/345,523, filed on Nov. 28, 1994, now U.S. Pat. No. 5,615,277.

FIELD OF THE INVENTION

The invention relates generally to electronic computer systems designed to calculate and store a provider's incentive rewards for a rewards recipient. More specifically, this invention relates to tokenless biometric computer systems which do not require the rewards recipient to use any man-made portable memory devices such as smart cards or magnetic swipe cards.

BACKGROUND

Consumer rewards or incentive systems have become an integral part of retail point of sale and internet commerce marketing. Retailers have multiple objectives which include: attracting consumers to increase the amount of their purchases; inducing consumers to increase the frequency of their purchases from a particular retailer, and establishing a loyal purchasing pattern by the consumer with that retailer; increasing the number of consumers who purchase from a particular retailer, and to obtain demographic data from consumers about their purchasing. Reward systems are often customized for each rewards issuer, hence the recipient must carry a different token for each retailer in order to receive that retailer's consumer incentives.

Hence, in addition to their debit and credit cards, consumers are now encumbered with additional cards to carry, all of which can easily be lost, damaged or stolen. After initially signing up with these incentive programs, consumers soon dispense with their incentive cards, therefore, either the consumer incentive program offered by the retailer fails or is not as successful as it was once thought to be.

Additionally, the use of cards by consumers for accessing such rewards systems is costly and disadvantageous. Namely, retailers must absorb the cost of producing such tokens and then distributing them to consumers. Furthermore, as tokens are lost, damaged, or stolen, retailers absorb the cost of replacing the token to the consumer. Further, retailers use these tokens to only identify the consumer's rewards account, rather than being able to identify the consumer directly.

This presents several problems for the retailer. In the event that the consumer's token is stolen or lost, a fraudulent party can present such a rewards token in order to obtain the cost-savings or other benefits to which they are not rightfully entitled.

As a result, the retailer must bear the cost of inadvertently providing these incentives to a consumer who has had not the requisite purchasing patterns to benefit from them. Hence, the retailer is literally rewarding the wrong party and paying twice for this mistake. This is because the original consumer will likely demand from the retailer their rightful rewards even without having the token to authenticate their account. The retailer will thereby pay for the rewards for the genuine consumer as well.

Last, such tokens have additional costs to the retailer in that the desired demographic and purchasing pattern data can be easily de-linked once the token is separated from the consumer. This occurs because a fraudulent party makes purchases with a token that incorrectly identifies the user's rewards account as the original consumer's, thereby attributing such purchases by the fraudulent party to the original consumer's purchasing profile. At the same time, when the genuine consumer demands their rightful rewards upon making their own purchases without their appropriate rewards token, the retailer must use another, likely generic (e.g., store account), rewards account in order to accommodate that consumer's requirement of benefiting from the incentives rightly due to them based on their purchases. Hence, the retailer's access to accurate consumer purchasing patterns can be significantly diluted by such unreliable information, thereby causing the retailer additional losses as their target-marketing campaigns and inventory strategies are adversely affected by this inaccurate demographic data.

The use of various biometrics, such as fingerprints, hand prints, voice prints, retinal images, handwriting samples and the like have been suggested for identification of individuals. However, because the biometrics are generally stored in electronic (and thus reproducible) form on a token and because the comparison and verification process is not isolated from the hardware and software directly used by the recipient attempting access, the problem of having to carry cards is not alleviated.

It has also been suggested that smartcards can also be used for tracking the rewards accrued by a consumer. However, smartcard-based system will cost significantly more than the "dumb" card. A smartcard costs in excess of $3, and a biometric smartcard is projected to cost in excess of $5. In addition, each point of sale station would need a smartcard reader. Furthermore, the net result of "smartening" the token is centralization of function. This may look interesting during design, but in actual use results in increased vulnerability for the consumer. Given the number of functions that the smartcard will be performing, the loss or damage of this all-controlling card will be excruciatingly inconvenient for the cardholder. Losing a card full of accrued rewards will result in the loss of the accumulated rewards.

There is a need for an electronic rewards transaction system that uses a strong link to the person being identified, as opposed to merely verifying a recipient's possession of any physical objects that can be freely transferred.

There is a further need for an electronic rewards transaction system is ensuring consumer convenience by providing authorization without forcing the consumer to possess, carry, and present one or more proprietary tokens, such as man-made portable memory devices, in order to accumulate the rewards. Anyone who has lost a card, left it at home, had a card stolen knows well the keenly and immediately-felt inconvenience caused by such problems. Therefore, there is a need for an electronic biometric rewards transaction system that is entirely tokenless.

There is another need in the industry for a rewards system that is sufficiently versatile to accommodate both consumers who desire to use personal identification numbers (PINs) for added security and also consumers who prefer not to use them.

Lastly, such a system must be affordable and flexible enough to be operatively compatible with existing networks having a variety of electronic transaction devices and system configurations.

As such, it is an objective of the invention to provide an electronic rewards system and method that eliminates the need for a rewards recipient to directly possess any personalized man-made token which is encoded or programmed with data personal to or customized for a single authorized rewards recipient, such as a smart card, magnetic swipe card or a personal computer with resident recipient-specific data.

It is another object of the invention to provide a computer system that is capable of verifying a rewards recipient's identity, as opposed to verifying possession of propriety objects and information. It is yet another object of the invention to verify rewards recipient identity based on one or more unique characteristics physically personal to the rewards recipient. Yet another object of the invention is to provide a computer system wherein access is secure, yet designed to be convenient and easy for a consumer to use.

Yet another object of the invention is to enable a rewards recipient to earn incentive rewards which are either immediately provided to the rewards recipient or are stored for later access by the rewards recipient. Yet another object of the invention is to enable retailers to correctly identify a consumer using the computer system so that their purchasing patterns can be linked to their personal demographic data. In this way, the retailer can more efficiently deliver products and services to pre-identified or interested consumers.

Another objective of the invention is that the rewards issuer be identified by an electronic identicator, wherein the rewards issuer's identification is verified. Therefore, the rewards issuer would register with the electronic identicator a rewards issuer identification data, which can consist of any of the following data: a rewards issuer hardware identification code, a rewards issuer phone number, a rewards issuer email address, a rewards issuer digital certificate code, a rewards issuer rewards account number, a rewards issuer biometric, or a rewards issuer biometric and PIN combination.

Another objective of the invention is to be added in a simple and cost-effective manner to existing terminals currently installed at points of sale and used over the internet. Yet another objective of the invention is to be efficiently and effectively operative with existing financial transactions systems and protocols, specifically as these systems and protocols linked to the processing of electronic rewards programs.

SUMMARY OF THE INVENTION

The present invention satisfies these needs by providing a significantly improved system and method for processing tokenless electronic rewards transactions between a rewards issuer and a rewards recipient using an electronic identicator and at least one biometric input apparatus. The method of the invention includes a tokenless authorization of a reward transaction between an issuer and a recipient using an electronic identicator and at least one recipient bid biometric sample, the method comprising the following steps. A recipient registration step, wherein a recipient registers with an electronic identicator at least one registration biometric sample. An issuer registration step, wherein the issuer registers identification data with the electronic identicator. During a transaction formation step, wherein an electronic reward transaction is formed between the issuer and the recipient, comprising issuer bid identification data, transaction data, and at least one recipient bid biometric sample, the bid biometric sample is obtained from the issuer's person. In at least one transmission step, the issuer bid identification data, the transaction data, and recipient bid biometric samples are electronically forwarded to the electronic identicator. In a recipient identification step, the electronic identicator compares the bid biometric sample with at least one registered biometric sample for producing either a successful or failed identification of the recipient. In an issuer identification step, the electronic identicator compares the issuer's bid identification data with an issuer's registered identification data for producing either a successful or failed identification of the issuer. Thereby, upon successful identification of the recipient and issuer, a reward transaction is authorized for debit or credit settlement of reward units from the recipient's rewards account, without the recipient presenting any personalized man-made tokens such as smartcards or magnetic swipe cards.

Preferably, the method further includes registering an issuer biometric sample with the electronic identicator, which is compared in the issuer identification step with at least one issuer registered biometric sample for identification of the issuer. Preferably, the method includes registering a recipient personal identification number with the electronic identicator, which is used by the electronic identicator to identify the recipient.

The device of the system for tokenless transaction of electronic reward-units transfer to a recipient includes, an electronic identicator for comparing the bid and registered biometric samples of a recipient of reward units, and for comparing the bid and registration identification data of an issuer of reward units. It further includes a party identification apparatus for submission of the recipient's biometric samples and the issuer's identification data; an electronic reward registry of reward units, having the reward-units disbursed to a recipients based upon the occurrence of predetermined criteria. A recipient rewards account stores accrued reward units. Finally, an execution module debits and credits the recipient reward account based upon the occurrence of predetermined criteria. Therefore, no man made tokens such as cards or smartcards are presented for executing the transaction.

A method for processing tokenless electronic reward-units transfer to a recipient using an electronic identicator and at least one recipient biometric sample, includes creating an electronic registry of reward units, having the reward-units disbursed to a recipient based upon the occurrence of predetermined criteria. In a recipient registration step, wherein the recipient registers with the electronic identicator at least one registration biometric sample. In a recipient identification step, wherein the identicator compares a recipient bid biometric sample with at least one previously registered biometric samples for producing either a successful or failed identification of the recipient. Finally, in a recipient reward-units issuance step, upon successful identification of the recipient, a reward transaction is authorized for debit or credit settlement of reward units from the recipient's rewards account, without the recipient presenting any personalized man-made tokens such as smartcards or magnetic swipe cards.

The present invention is significantly advantageous over the prior art in a number of ways. First, it is extremely easy and efficient for people to use because it eliminates the need for rewards recipients to directly possess any personalized tokens such as magnetic swipe cards or personal computers with resident user-specific data, in order to access their authorized rewards accounts. The present invention therefore eliminates all the inconveniences associated with carrying, safeguarding, and locating such tokens. The consumer is now uniquely empowered, by means of this invention, to conveniently conduct his electronic reward transactions at any time without dependence upon tokens which may be stolen, lost or damaged.

The invention is clearly advantageous from a convenience standpoint to rewards issuers and rewards institutions by making electronic rewards transactions less cumbersome and more spontaneous. The paperwork of tokenless biometric rewards transactions is significantly less than that required with standard couponing and rewards transactions wherein the copies of the coupon must often be retained by the rewards issuer or the rewards recipient.

Further, the substantial manufacturing and distributing costs of issuing and reissuing all personalized tokens such as paper coupons, magnetic swipe rewards cards, and smart rewards cards, thereby providing further economic savings to issuing retailers, businesses, and ultimately to consumers.

Even the traditional requirement for internet electronic transactions of the buyer needing to directly possess and use the ultimate personalized token, a personal computer with resident buyer-specific data, will be eliminated. The invention is also clearly advantageous from a convenience standpoint to retailers by making electronic rewards transactions significantly more accurate and more precise with regard to the monitoring of consumer demographics and purchasing patterns.

Moreover, the invention is markedly advantageous and superior to existing systems in being highly fraud resistant. The present invention virtually eliminates the risk of granting access to unauthorized users by determining identity from an analysis of a user's unique biometric characteristics.

Further, the invention can be cost-effectively integrated with existing financial transaction systems currently installed at points of sale and over the internet.

These and other advantages of the invention will become more fully apparent when the following detailed description of the invention is read in conjunction with the accompanying drawings.

DETAILED DESCRIPTION

The invention provides a tokenless biometric method and system for authorizing reward transactions and the debiting and crediting of reward units from a reward recipient's electronic account, either at the retail point of sale or over the Internet. It is the essence of this invention that the rewards recipient not be required to directly use any man-made personalized token in order to effect the transaction. A computer system is used to accomplish these goals.

A reward-unit is defined as any unit of currency, product, points, mileage, minutes, or service, which is honored by a participating merchant such that a recipient's expenditure of these units results in the recipient's receipt of goods or services. Such reward-units may take many forms, such as providing the consumer with immediate dollar amount discounts on purchased goods, accrued free mileage on frequent flyer programs offered by airlines, free minutes towards the use a telephone calling account, accumulated point towards a free product or service, and the like.

A rewards issuer is any merchant, on-line internet based merchant, a service provider, or a direct manufacturer. Such reward issuers include a phone company, a athletic apparel manufacturer, a book or music vendor, an internet service provider, a supermarket, and the like.

A rewards account is defined as an account that contains reward-units deposited by a rewards issuer. The rewards account is optionally managed by the rewards issuer, or by a third party which manages rewards accounts from multiple issuers. The rewards issuer is optionally an individual or entity, such as a retail service provider, a retail product provider, or an a third party. A rewards transaction is any electronic debiting or crediting of reward-units with respect to a recipient's rewards account. Transaction data includes any data that is necessary for the consummation of the rewards transaction including, price information, number of units of rewards, date, time, and other electronic instructions.

The system or an electronic identicator, which is used for identifying the rewards recipient and issuer, comprises the following components:

Party Identification Apparatus (PIA)

Communication lines

Data Processing Center (DPC)

These components together allow a rewards issuer to originate a reward transaction without requiring the recipient to present any man made token such as plastic or paper cards, or other physical objects, for obtaining or expending, and e documentation of obtaining or expending reward-units.

Party Identification Apparatus (PIA)

Figure 1:
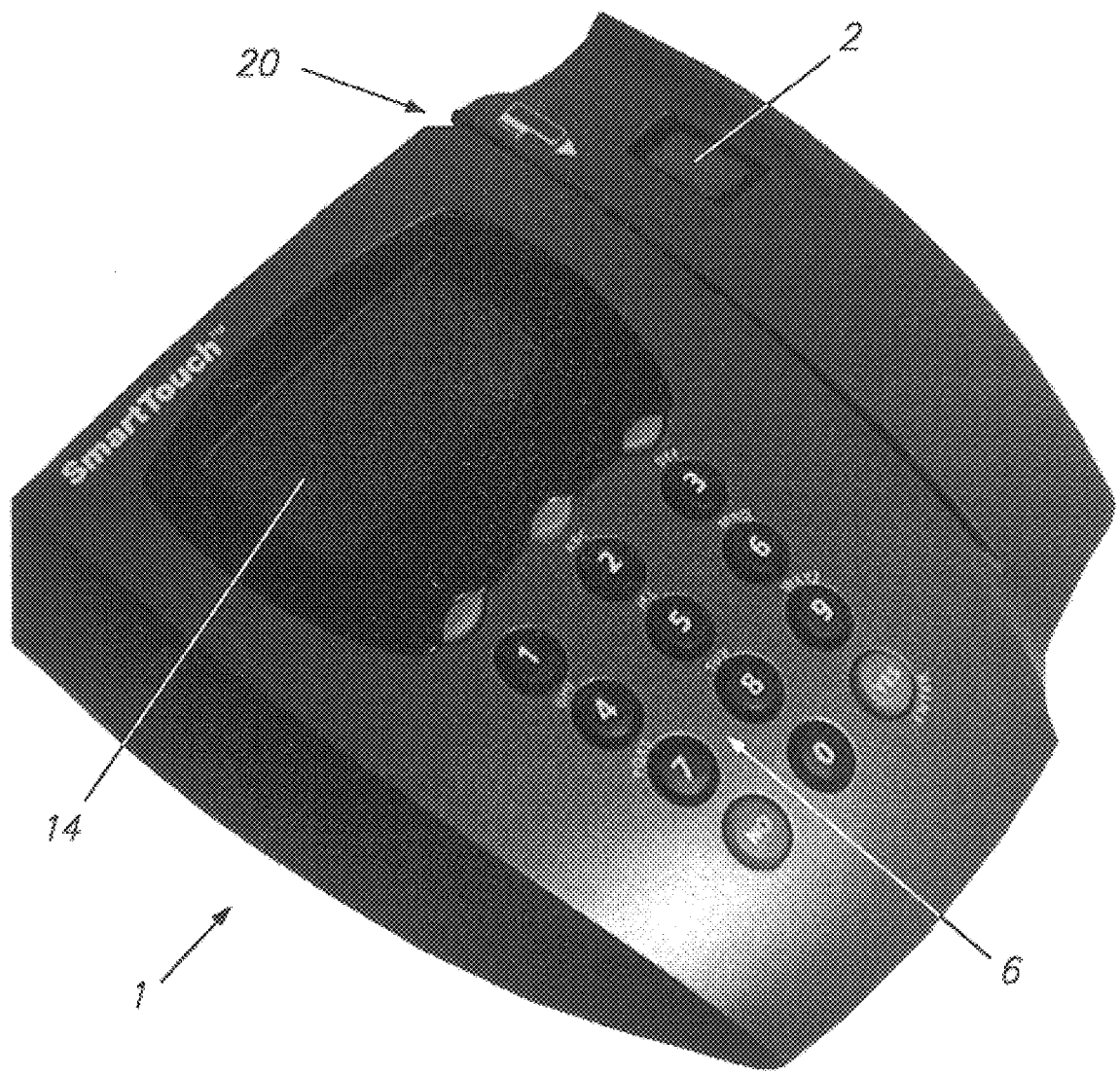
FIG. 1 shows the preferred embodiment of a Party Identification Device (PIA) with a biometric sensor and key pad.

The PIA is a device that gathers the identity data or information of the recipient, and/or stores the identity information of the issuer, for use in authorizing reward transactions. Each PIA conducts one or more of the following operations:

gather biometric input from a rewards issuer or recipient gather a PIN code or password from a rewards issuer or reward recipient secure communication between PIA and DPC using encryption secure storage of secret encryption keys store and retrieve a unique rewards issuer PIA hardware identification code secure enclosure & components from unauthorized tampering display information, allow parties to approve or cancel a reward transaction scan a magnetic stripe card store, verify, and retrieve a rewards issuer digital identification code allow parties to select among choices of rewards issuer and recipient accounts A preferred embodiment containing these components is shown in FIG. 1.

Biometric input is gathered using a biometric sensor 2 located within PIA 1. Biometric sensor 2 is a finger image sensor, however it is understood that other types of biometric sensors such as iris scan and others are optionally used.

For PIAs requiring a fingerprint sensor, the PIA has a biometric fraud detection mechanism (not shown) that will assure that any biometric input gathered from the biometric sensor is from a real physical person, instead of a copy or replica. Preferably for the finger image sensor, this is a blood flow detector.

For systems employing a PIN, PIN input is preferably gathered using a keypad or PIN pad 6 that is also located securely inside the PIA.

Communication security is provided by encryption using unique secret keys known only to that specific PIA and the DPC, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between PIA and DPC. Both DES and public key encryption is well known in the industry.

The PIA also has secure memory that can store and retrieve the unique secret encryption keys used to enable secure communications with the DPC. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each transaction, without leaving behind the trace of the initial secret key. The implications of this are that even successful capture and dissection of a PIA will not reveal messages that have previously been sent, a very important goal when the effective lifetime of the information transmitted is years. DUKPT is fully specified in ANSI X9.24. The DUKPT key table is stored in the secure memory.

Each PIA preferably has a hardware identification code that is registered with the DPC at the time of manufacture. This makes the PIA uniquely identifiable to the DPC in all transmissions from that device. This hardware identification code is stored in write-once memory.

PIA physical security is assured by standard mechanisms. Preferably, these comprise tamper-detect circuitry, an enclosure that cannot be easily opened without visibly injuring the enclosure, erasable memory for critical secrets such as encryption keys, write-once memory for hardware identification, tight integration of all components, and "potting" of exposed circuitry.

Information such as the amount of a transaction, the identity of a recipient, or other transaction-related information is displayed using an integrated LCD screen 14. It is preferable that the LCD screen be connected securely to the other components in the PIA to maintain security. Approval or cancellation of a reward transaction is done using the PIA keypad.

A magnetic stripe reader 20 is optionally used to read any account information that is encoded on the magnetic stripe of a card. This is used during initial registration for efficient gathering of a recipient's registration data. Optionally, the PIA also validates public key digital certificates. In one embodiment, public keys of a particular certifying authority are initially stored in the PIA at the time of construction. This provides the mechanism to verify a rewards issuer's digital certificates that are signed by the certifying authority.

Although a preferred embodiment is described above, there are many different variations on specific PIA implementations. Fundamentally any device that is secure, can identify a person or entity with a high degree of certainty, and can connect to the DPC via some form of communication line can serve as a PIA.

In some embodiments, specifically the home use and public use instances, the PIA hardware identification code is not used to identify either the rewards issuer or the reward recipient.

Communication Lines

Communications between the PIA and the DPC occur via many different communication methods. Most depend on the particular communication networks already deployed by the organization or retailer that deploys the transaction authorization system.

In an embodiment the PIAs 1 are connected via Ethernet to a local router, which is itself connected to a network operations center (NOC) via frame relay lines. At least one DPC 22 is located at the NOC. Messages are sent from PIA to the DPC using TCP/IP over this network. In another embodiment, the PIAs 1 are connected via a cellular digital packet data (CDPD) modem to a CDPD provider, who provides TICP/IP connectivity from the PIA to an intranet to which at least one DPC 22 is attached.

In yet another embodiment, a PIA is connected via the Internet, as is at least one DPC. TCP/IP is used to transmit messages from PIA to DPC. There are many different ways to connect PIA to DPC that are well understood in the industry.

Data Processing Center

The Data Processing Center 22 (DPC) or electronic identicator serves to identify the issuer and the recipient in the rewards transaction. The DPC retrieves reward account information for identified parties, and performs the execution that will result in settlement of transactions.

Figure 2:
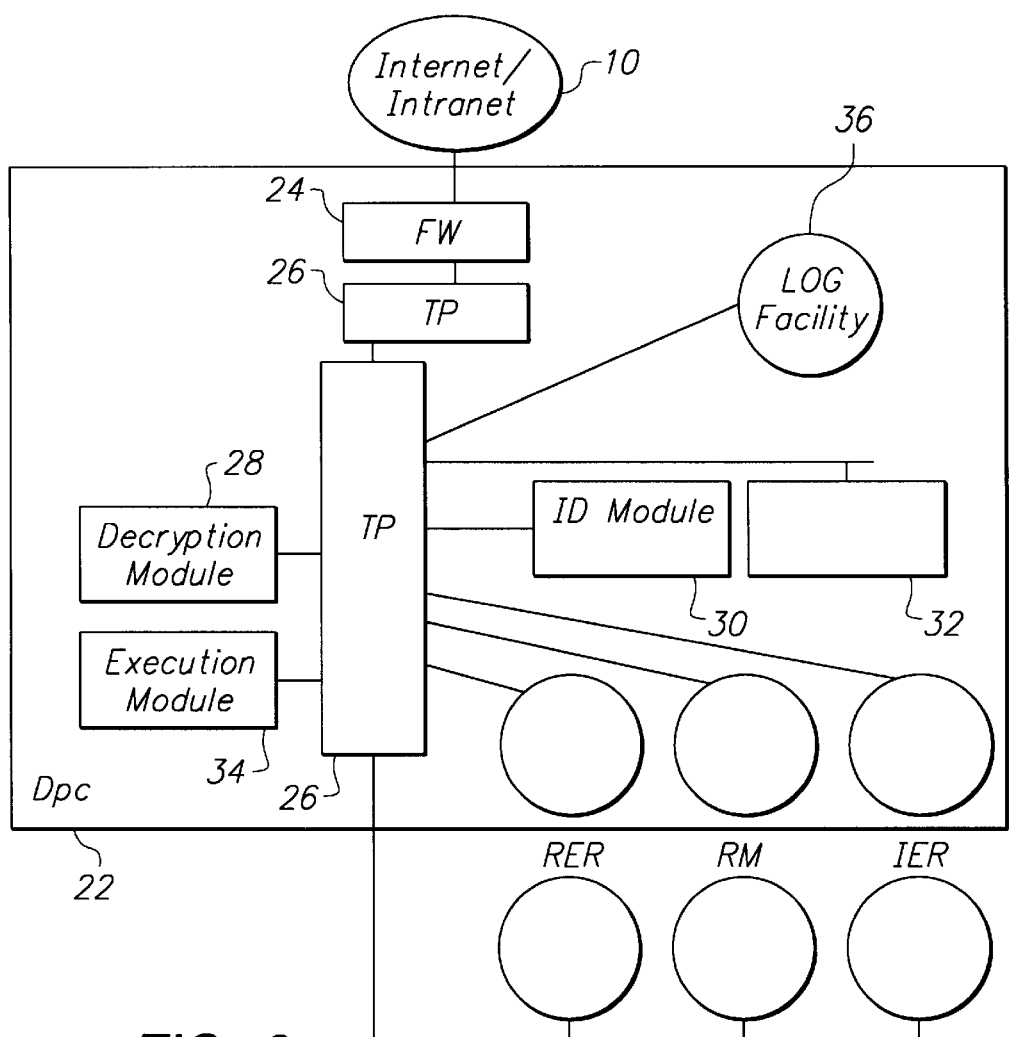
FIG. 2 is a preferred embodiment of the Data Processing Center (DPC) showing the connections between its components.

As seen in FIG. 2, the DPC 22 is connected to the Internet or intranet 10 using a firewall machine 24 that filters out all messages that are not from legitimate PIA devices. Messages are then sent to a transaction processor (TP) 26, which is responsible for overseeing the steps required to process the transaction.

In an embodiment, the reward transaction messages between the PIA and the DPC are encrypted. For this, the transaction processor uses the decryption module (DM) 28, which utilizes the hardware identification code of the PIA to identify the encryption codes that is required to decrypt the message from the PIA. Once decrypted, the identity of both parties to the transaction is determined using identification module (IM) 30. TP 26 retrieves the recipient's electronic registry that contains one or more reward accounts. It also retrieves the default rule module that is identified by the issuer identification (Issuer ID).

Once the rewards account of the recipient is selected from the recipient's electronic registry (RER) the reward transaction is executed by the execution module (execution module) 34. TP 26 instructs the execution module to take the necessary steps for proper debit or credit of the recipient reward account. If the instruction was for debiting of the rewards account and there are insufficient resources present in the recipient's rewards account, the transaction is denied. Each transaction (successful or not) is logged in the logging facility (LF) 36.

In a preferred embodiment, more than one DPCs provide fault tolerance from either natural or man-made disasters. In this embodiment, each DPC uses a backup power generator, redundant hardware, mirrored databases, and other standard fault tolerant equipment known in the industry.

Decryption Module (DM)

In a preferred embodiment, all messages the DPC receives, with the exception of those not constructed by a PIA, contain a PIA hardware identification code, a sequence number, and a Message Authentication Code (MAC). (Message authentication codes, also known as cryptographic checksums, well known in the transaction industry, are used to assure that any changes to the content of the message will be detectable by the entity receiving the transmission.). The DM validates the message's MAC and then checks the sequence number for that particular PIA. If the DM determines that both the MAC and the sequence number are valid, the DM uses the unique secret key for that particular PIA to decrypt the message. For the decryption to function properly, the DM must contain a copy of each PIA's DUKPT key table.

If the decryption operation fails, or if the MAC check fails, the message is considered an invalid message. The TP logs a warning to the LF, terminates processing for the message, and returns an error message to the originating PIA.

Each message TP 26 receives preferably contains a response key stored in the encrypted section of the message. Before the TP replies to a message that includes a response key, it instructs the DM to encrypt the response message with that response key. The DM also generates a MAC for the response and appends it to the message.

Preferably, error messages are not encrypted although the DM does include a MAC for message authentication. Such messages never include confidential information. However, most response messages include a status or response codes that can indicate whether the request succeeded or not. For example, when the execution module declines a transaction for financial reasons, it does not return an error message, it returns a normal transaction response message with a response code set to "failed".

Identification Module (IM)

Identification of the issuer and the recipient occurs using different methods, depending on the identification information that is provided by the PIA. The identification module has subsystems for each type of information that is received by the IM, and each subsystem is highly optimized to provide rapid identification as outlined below.

In a preferred embodiment, identification module 30 comprises subsystems that can identify parties from the following information:

- biometric data and PIN
- biometric data alone
- digital identification (digital certificates)
- PIA hardware identification code

Biometric-PIN Identification Subsystem (BPID)

In a preferred embodiment, the BPID subsystem comprises at least two BPID processors, each of which is capable of identifying parties from their biometric and PIN codes.

Preferably, the database of parties identifiable from biometric-PIN combinations is distributed equally across all BPID processors. Each processor is then responsible for a subset of identifications.

Figure 3:
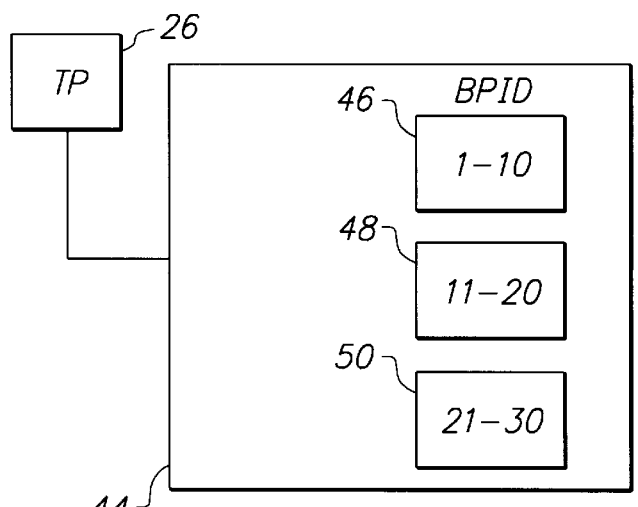
FIG. 3 shows an embodiment of the Biometric-PIN identification mechanism where the transaction processor determines a Biometric-PIN from the Biometric-PIN Identification subsystem is responsible for a given subdivision of the biometric database.

In FIG. 3, TP 26 determines which Biometric-PIN from the BPID subsystem 44 is responsible for a given subdivision of the biometric database. In one embodiment, one BPID 46 is responsible for identifying people with PINs 1–10, another BPID 48 is responsible for identifying PINs 11–20, and a third BPID 50 is responsible for identifying PINs 21–30. For example, all messages from the PIA containing a PIN that equals the number 30 would be routed to BPID 50 for identification of the rewards recipient.

Once a BPID processor receives a bid biometric sample and PIN for identification, the processor searches through its database, retrieving all registered biometric samples that match or correspond to that particular bid PIN. Once all corresponding registered biometric samples are retrieved, the comparator compares the bid biometric from the message to all retrieved registered biometric samples. If a match is found, the processor transmits the identity of the party back to TP 26. If no match is found, the processor transmits a "not identified" message back to TP 26.

Biometric Identification Subsystem (BID)

In another embodiment, the BID subsystem comprises at least two BID processors, each of which is capable of identifying recipients only from their biometric sample.

In one embodiment, each BID processor contains the entire database of biometrics. To distribute the transactions evenly across processors without undue effort, the TP determines randomly which BID processor will be used for a given reward transaction, and delegates the identification request to that BID processor. That BID processor then performs a search of its biometric sample database in order to find a matching registered biometric sample.

In one embodiment, other information is present that assists the BID processor in searching the database. For finger images, this includes information such as the classification of the image (whirl, arch, etc.), and other information about the finger ridge structure that is useful for selecting out biometrics that are not likely to match (or information on biometrics that are likely to match).

Biometric comparisons are often more accurate if multiple biometrics are used. In some embodiments, multiple biometrics are used to more rapidly and more accurately identify individuals.

Digital Identification Subsystem

In a preferred embodiment, the digital identification subsystem comprises multiple processors, each of which is capable of identifying a rewards issuer from their digital certificates. In this embodiment, digital certificates are used to perform digital identification of the issuer. Preferably, these include corporate web site addresses and certifying authorities only. Where possible, computers provide digital certificates for identification and recipients use their biometrics.

A difficulty with digital certificates is verifying that a particular digital certificate is valid. This requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.

PIA Hardware Identification Subsystem (PHI)

In a preferred embodiment, PIA hardware identification codes are translated into issuer identification by the PHI subsystem. This subsystem maintains a list of all PIAs ever manufactured. Preferably, when a particular rewards issuer uses a PIA, that rewards issuer's identity is linked to that PIA. Any transactions that originate from that PIA is assumed to be destined for the issuer that used the PIA.

In another embodiment, the PIA hardware identification code does not serve to identify either the recipient or the rewards issuer. This is the case in PIAs purchased for public terminals, Automated Teller Machines, or for home use.

Transaction Processor (TP)

In a preferred embodiment, the transaction processor 26 receives the identification results from the identification module. Once the recipient and their rewards accounts, as well as the particular rule module that would govern this transaction is located, using the identity of the recipient, the transaction processor locates the recipient's Recipient Electronic Registry (RER). Using the issuer identification data (Issuer ID 64) contained in the transaction request message 60, the transaction processor identifies the issuer's default rule module 62 which contains the instructions for debit or credit of the recipients rewards account. Alternatively, the instruction for debit and credit and various other restrictions on credit or debit of a recipient's reward account is contained in the transaction request message itself 60. Should the transaction request message 60 contain an electronic pointer 68, the default rule module is then overridden and another rule module (rule module P1, P2, etc.) particular to the reward transaction is invoked.

In one embodiment, the recipient electronic registry 54 database contains at least one recipient rewards account (rewards account) from multiple recipients. Each rewards account for a recipient electronic registry is associated with a particular rewards issuer. Additionally, the rewards account has a demographic account 56, which contains data volunteered by the recipient. Reward-units debits and credits are settled in each recipient rewards account for a given transaction.

A rewards account contains reward-units received by the recipient. Reward-units are defined as any unit of currency, product or service which is honored by a participating merchant or issuer such that a recipient's expenditure of these units results in the recipient's receipt of goods or services. Such reward-units may take many forms, such as providing the consumer with immediate dollar amount discounts on purchased goods, accrued free miles on frequent flyer programs offered by airlines, free minutes towards the use a telephone calling account, accumulated point towards a free product or service, and the like.

In a preferred embodiment, each issuer rule registry contains at least one issuer rule module 70 (rule module), and any other rule modules associated with that particular issuer. An issuer rule registry is associated with an issuer's identification data.

Figure 5:
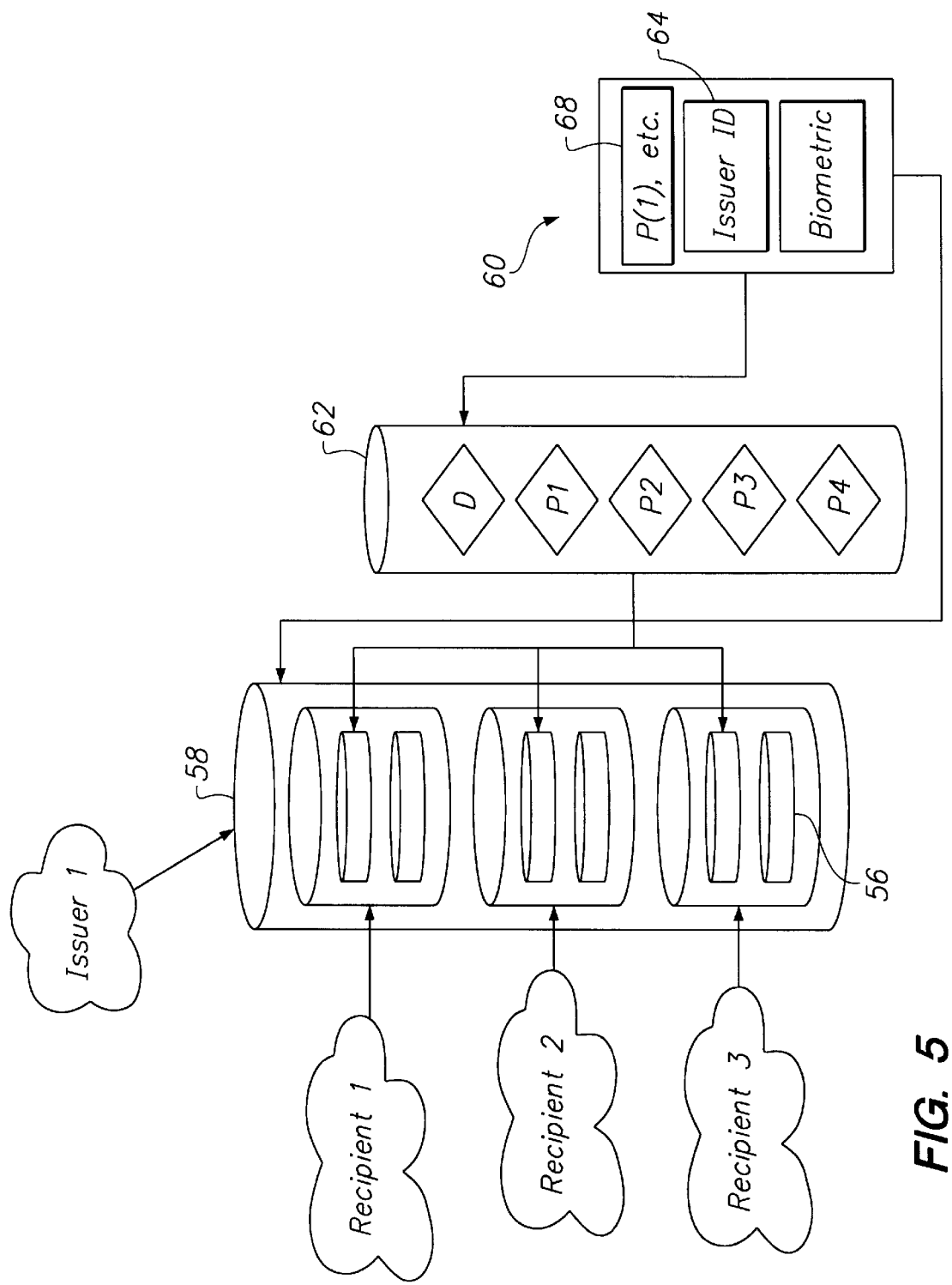
FIG. 5 shows an embodiment of the invention depicting the interaction between an issuer rule module and the issuer electronic registry where at least one rewards account from a different recipient is stored.

In another embodiment shown in FIG. 5, an issuer electronic registry 58 database associated with an issuer's identification data 64 (Issuer ID), and contains at least one recipient rewards account. Each rewards account within the issuer electronic registry is associated with a particular recipient's biometric or biometric-PIN. This rewards account, is credited or debited reward-units depending on the type of transaction that occurs. Additionally, the rewards account has a demographic account 56, which contains data volunteered by the recipient.

Electronic Pointer (EP)

An electronic pointer (electronic pointer) is an electronic instruction attached to a reward transaction message 60 which directs the TP 26 to invoke a specific rule module P1, P2, etc., for that particular reward transaction. In a preferred embodiment, in the event an electronic pointer is appended to the rewards transaction message, the particular rule model is invoked, otherwise the default rule module is invoked.

Issuer Rule Module (RM)

In a preferred embodiment, the issuer rule module is a computing module inside the issuer rule registry 70 which is programmed with an issuer's pre-designated criteria for determining how reward-units are credited to or debited from a rewards account, and performs the calculation and settlement for each reward transaction. Criteria can include a recipient's purchasing frequency, spending amounts, recency, demographics, and, where applicable, conditions for reward-units redemption such as expiration dates.

Execution Module (EM)

In a preferred embodiment, the execution module 34 generates a message to a rule module to cause the rewards transaction to be settled.

Figure 4:
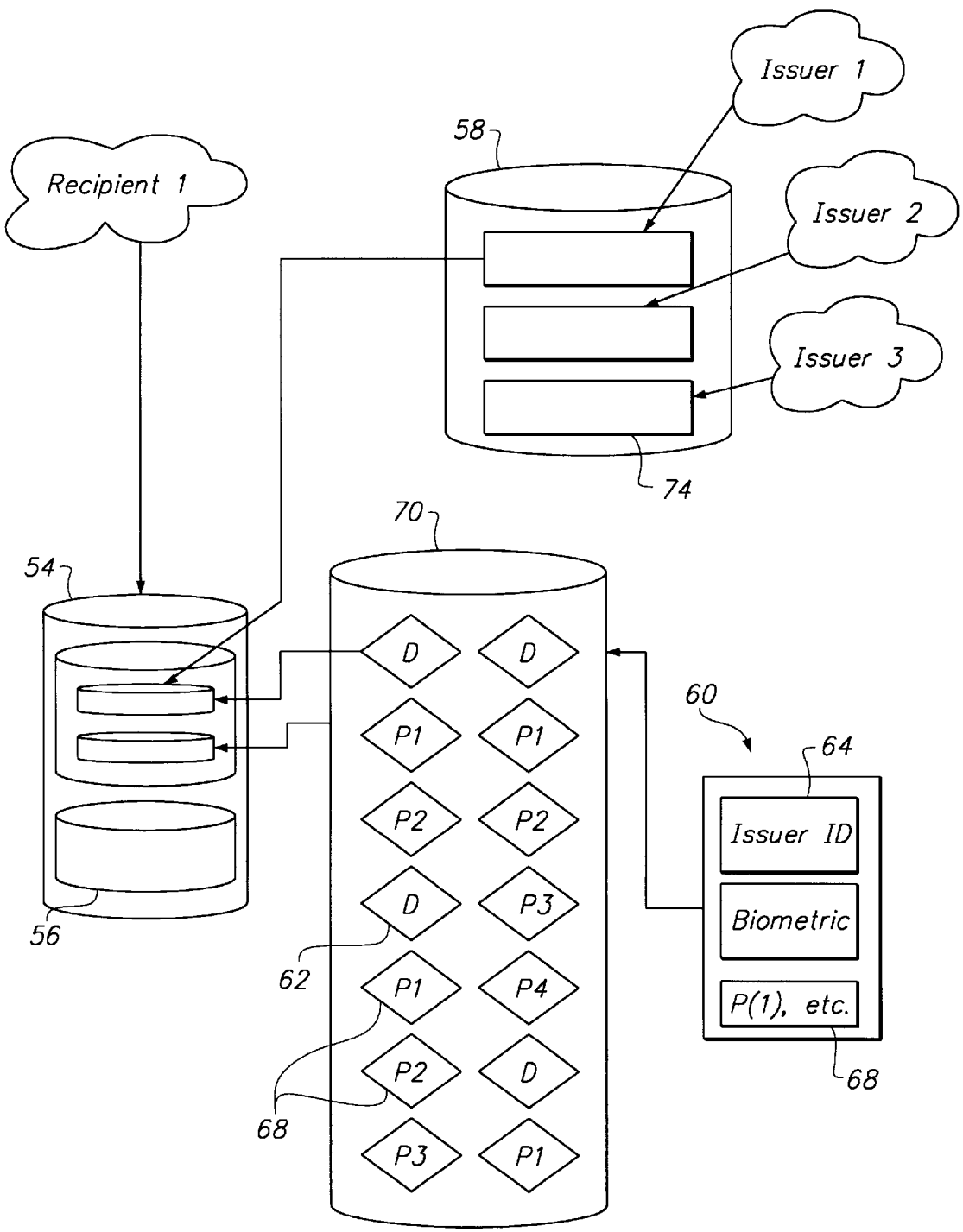
FIG. 4 shows an embodiment of the invention depicting the interaction between an issuer rule registry and the recipient electronic registry where each recipient registry has at least one rewards account from a different issuer.

In one embodiment shown in FIG. 4, upon successful identification of both parties by the IM, the TP will use the issuer identification data 64 to direct the execution module to invoke a rule module in a particular rewards transaction. In one embodiment, the recipient electronic registry, the issuer rule registry, and the issuer electronic registry databases are within the DPC. In another embodiment, the DPC communicates with at least one external computer system containing any one of the recipient electronic registry, the issuer rule registry or the issuer electronic registry.

A preferred embodiment of FIG. 4, has a recipient electronic registry and no issuer electronic registry. A preferred embodiment of FIG. 5, has an issuer electronic registry and no recipient electronic registry.

Once the rewards account is located and the applicable rule module is invoked, the reward-units are credited to the rewards account or debited from the rewards account depending upon the criteria specified in the rule module pertinent to the particular transaction. In the event there is insufficient reward-units in the rewards account for a rewards debiting transaction to be settled, the transaction is "declined".

Logging Facility

In a preferred embodiment, the logging facility (LF) 36 logs all reward transaction attempts, whether successful or not, to write-once media, so that a record is kept of each transaction and each error that has occurred during the operation of the electronic identicator.

Use-Sensitive DPC Configuration

While each DPC has some or all of the above features, in some embodiments the system has use-sensitive data processing capabilities, wherein multiple DPCs exist, some of which store a subset of the total number of registered parties.

This system comprises at least one master DPC, which contains a large subset of all parties registered with the system. The system further comprises at least two local DPCs that are physically apart from each other. Each local DPC contains a subset of the parties contained within the master DPC. Data communications lines allow messages to flow between each local DPC and the master DPC.

In this embodiment, identification request messages are first sent to the local DPC for processing. If a party cannot be identified by the local DPC, the message is forwarded to the master DPC. If the parties are identified properly by the master DPC, the message is processed appropriately. In addition, one or both party's identity information is transmitted from the master DPC to the local DPC, so that the next time parties will be successfully identified by the local DPC.

In another embodiment of a use-sensitive DPC system, the system further comprises a purge engine for deleting a party's identification information from the local DPC databases. In order to store only records for those parties who use the system more than a prescribed frequency and prevent the overload of databases with records from parties who use the system only occasionally, the record of a party is deleted from the local DPC databases if there has been no attempt to identify the party upon expiration of a predetermined time limit.

In order to make communications between the master DPC and the local DPCs secure, the system further comprises encryption and decryption means, wherein communications between the master DPC and local DPC are encrypted.

Registration

Typically, a rewards issuer registers issuer identification data (Issuer ID) with the electronic identicator. The Issuer ID comprises any of the following: digital certificate, hardware identification, web site, trade name, financial account number, telephone number, employer identification number, and the like.

Rewards issuer digital certificates are available from certifying authorities, and they provide the assurance that the entity with the certificate is the authentic owner of that identity. These certificates contain readable text and other information that describes the entity. This can include a corporate logo, the address, as well as the company name. This digital certificate is then linked to at least one rewards account template 74.

PIA hardware identification codes are unique numbers assigned to PIA devices at the time of manufacture. If a company wishes all transactions issuing from a given PIA to flow to a particular rewards account, the company registers any such PIAs with the DPC, which updates the PIA device records to reflect the ownership of the PIAs.

Preferably, the security surrounding the registration of entity digital certificates or PIA hardware identification codes to rewards account numbers is extremely strong, as this is a potential source for large losses over a short period of time.

In addition, the issuer registers at least one rule module which defines criteria and amounts for crediting or debiting a rewards account. The criteria or conditions can include a recipient's purchasing frequency, expenditure amounts, recency, expiration dates, demographics, along with settlement instructions, and any conditions for reward-units redemption.

The issuer also registers at least one rewards account template which is associated with the issuer. When a recipient wishes to take advantage of an issuer's rewards, as soon as the recipient is identified by the DPC, the rewards account template is copied either into the recipient electronic registry or the issuer electronic registry. An account number is optionally issued to this account which uniquely identifies the recipient rewards account to the issuer. The recipient thereby becomes a new registrant in that issuer's reward program.

In an embodiment when an issuer uses multiple rule modules to specify different reward-units calculation and settlement formulae, electronic pointers are registered with the system which designate and invoke the various rule modules.

A recipient registers with the electronic identicator, a biometric, biometric-PIN and other registration data such as the recipient's demographics. To register, a recipient submits a registration biometric sample obtained from their physical person by the PIA's biometric sensor. The PIA determines that the biometric scan is non-fraudulent, and then translates and compresses that biometric scan into a format suitable for rapid transmission to the DPC. In a preferred embodiment, the recipient then enters a PIN code into the PIA keypad. The PIA transmits the registration data and identification data to the DPC. The DPC then inserts the biometric (or biometric-PIN) into the appropriate identification database and enables the person to originate reward transactions.

In one embodiment, the DPC automatically assigns a new recipient electronic registry to a person's biometric or biometric-PIN. Once that person becomes a new user of an issuer's reward-units program, that particular issuer's rewards account template 70 is automatically copied and imported into that recipient's recipient electronic registry (RER). The newly formed rewards account is automatically assigned a unique account number which can be identified by the issuer.

In another embodiment, the registration process further comprises registering a recipient private code with the electronic identicator, which is distinct from a personal identification number and not used in the recipient identification step. The private code is displayed to the recipient to validate that the authentic electronic identicator has processed the transaction.

Transactions optionally occur at a retail point of sale, across the network from a network merchant, or at home or public terminal from one person to another.

Retail Point of Sale Transactions

Retail point of sale transactions are characterized by identifying the recipient using their biometric sample or biometric sample-PIN on a PIA usually operated by the rewards issuer. The recipient is thus identified through biometrics, while the rewards issuer is identified through the PIA's hardware identification code.

In a preferred embodiment, a recipient at the point of sale originates a reward transaction in the following manner. First, the recipient submits a bid biometric sample obtained from their physical person by the PIA's biometric sensor. The PIA determines that the biometric sample is non-fraudulent, and then translates and compresses that biometric sample into a format suitable for rapid transmission to the DPC.

Next, the recipient enters a PIN code into the PIA keypad. At this point, the PIA transmits the biometric-PIN to the DPC for identification, along with the PIA hardware identification code. The DPC identifies the recipient using the biometric sample, and identifies the rewards account of the recipient. The DPC identifies the issuer's reward registry using the PIA hardware identification code that was previously registered by the issuer.

The transaction data is then entered into the PIA, either using an electronic cash register or manually, by the recipient. The recipient then either approves or cancels the transaction using the PIA's keypad. Once the reward transaction is approved by the recipient, the PIA transmits a rewards transaction message to the DPC, which the DPC then forwards to the proper execution module for execution and settlement.

Execution of the transaction may result in a declined transaction due to lack of reward-units or other problem condition reported by the rewards issuer. If the transaction is declined, the DPC transmits the decline notification back to the PIA.

Network Point of Sale Transactions

Network point of sale transactions are characterized by identifying the recipient using the recipient's bid biometric sample submitted through the recipient's personal PIA, or through a public PIA attached to an ATM or other public terminal. The rewards issuer is a registered network merchant, and is identified through a digital certificate. Thus the recipient is identified through biometrics, while the rewards issuer is identified through the verification of a digital certificate issued by an authorized certifying authority.

In a preferred embodiment, the recipient first locates the rewards issuer by locating the issuer's place of business on the network: the web site, using the network address of the rewards issuer. The recipient downloads the rewards issuer's digital certificate to the PIA that the recipient is using. The PIA verifies that the digital certificate provided by the rewards issuer is a valid certificate.

The recipient then submits a bid biometric sample obtained from their physical person using the PIA's biometric sensor. The PIA determines that the biometric scan is non-fraudulent, and then translates and compresses that biometric scan into a format suitable for rapid transmission to the DPC. The recipient then enters a PIN code into the PIA keypad. The PIA transmits the biometric-PIN to the DPC for identification, along with the rewards issuer's digital certificate.

Both parties identify the rewards accounts to be involved in the transaction. The recipient must do this in an automated manner. In a preferred embodiment, this occurs at the DPC using account selection information included in the transaction by the recipient. The recipient's rewards account is automatically selected by the DPC.

The amount of the transaction is also transmitted to the PIA by the rewards issuer. The recipient then either approves or cancels the transaction using the PIA's keypad. Once the transaction is approved, the PIA transmits the reward transaction to the DPC, where the DPC authorizes the reward transaction and transmits a new reward transaction to the appropriate reward-units electronic registry for authorization or execution.

Execution by the DPC may result in a declined transaction due to lack of reward-units in the account, a closed account, or some other immediately detectable problem condition. If the transaction is declined, the DPC transmits the decline notification back to the PIA.

In one embodiment, the PIA is actually built-in and/or integrated with a personal computer. These personal computer PIA hardware identification codes are not used to identify either party in a transaction.

In another embodiment, the recipient can be a representative of a business entity that has permission to access the business entity's rewards accounts to purchase items on the network.

In yet another embodiment, settlement of reward units is delayed for an agreed-upon time period, to enable implementation of net-30 settlement terms and the like.

In one embodiment, the reward-units from a network transaction are deposited into an escrow account for the internet rewards issuer or a recipient, instead of being directly deposited into or withdrawn from the actual recipient's rewards account as a direct settlement for the reward-units to be debited or credited.

From the foregoing, it will be appreciated how the objectives and features of the invention are met. First, the invention provides a reward transaction computer system that eliminates the need for a recipient to possess and present any personalized man-made tokens, in order to authorize a transaction.

Second, the invention provides a reward transaction computer system that is capable of verifying a recipient's unique personal identity, as opposed to verifying possession of personalized objects and information.

Third, the invention verifies the recipient's identity based upon one or more unique characteristics physically personal to the user.

Fourth, the invention provides a cost-effective reward transaction system that is practical, convenient, and easy use.

Fifth, the invention provides a system of secured access to a computer system that is highly resistant to fraudulent transaction authorization attempts by unauthorized users.

Although the invention has been described with respect to a particular electronic identicator and method for its use, it will be appreciated that various modifications of the apparatus and method are possible without departing from the invention, which is defined by the claims set forth below.

What is claimed is:

1. A method for tokenless authorization of a reward transaction between an issuer and a recipient using an electronic identicator and at least one recipient bid biometric sample, said method comprising the steps of:

a. a recipient registration step, wherein a recipient registers with an electronic identicator at least one registration biometric sample;

b. an issuer registration step, wherein the issuer registers identification data with the electronic identicator;

c. a transaction formation step, wherein an electronic reward transaction is formed between the issuer and the recipient, comprising issuer bid identification data, transaction data, and at least one recipient bid biometric sample, wherein the bid biometric sample is obtained from the issuer's person;

d. at least one transmission step, wherein the issuer bid identification data, the transaction data, and recipient bid biometric sample are electronically forwarded to the electronic identicator;

e. a recipient identification step, wherein the electronic identicator compares the bid biometric sample with at least one registered biometric sample for producing either a successful or failed identification of the recipient;

f. an issuer identification step, wherein the electronic identicator compares the issuer's bid identification data with an issuer's registered identification data for producing either a successful or failed identification of the issuer; wherein upon successful identification of the recipient and issuer, a reward transaction is authorized for debit or credit settlement of reward units from the recipient's rewards account, without the recipient presenting any personalized man-made tokens such as smartcards or magnetic swipe cards.

2. The method of claim 1 wherein the issuer identification data comprises any one of the following; an issuer hardware identification code, an issuer telephone number, an issuer email address, an issuer digital certificate code, an issuer account index, an issuer rewards account number, an issuer biometric, and an issuer biometric and PIN combination.

3. The method of claim 1 wherein the issuer registration step further comprises registering an issuer biometric sample with the electronic identicator, which is compared in the issuer identification step with at least one registered biometric sample for identification of the issuer.

4. The method of claim 1 wherein the recipient registration step further comprises registering a recipient personal identification number with the electronic identicator, which is used by the electronic identicator to identify the recipient.

5. The method of claim 1 further comprising a recipient resource determination step, wherein it is determined if the recipient's rewards account has sufficient resources to be debited for an amount specified in the transaction data.

6. The method of claim 1 further comprising a transaction settlement step, wherein the transaction data is credited to a recipient's rewards account.

7. The method of claim 1 wherein the registration step further comprises registering a recipient private code with the electronic identicator, which is distinct from a personal identification number and not used in the recipient identification step, wherein the private code is displayed to the recipient to validate that the authentic electronic identicator has processes the transaction.

8. The method of claim 5 wherein both the recipient resource determination step further comprises the electronic identicator communicating with one or more external computers.

9. The method of claim 1 wherein the transaction data comprises price information, a list of goods and services, an issuer name, a date or time, a location, or an invoice number.

10. The method of claim 6 wherein the transaction settlement step further comprises the recipient designating a future date on which the reward-units are to be deducted from the recipient's rewards account and credited to the issuer's rewards account.

11. The method of claim 1 further comprising a recipient re-registration step, wherein the user's registration biometric samples are compared against previously designated biometric samples wherein if a match occurs, the computer system is alerted to the fact that the recipient has re-registered with the electronic identicator.

12. The method of claim 1 wherein the biometric sample comprises of one of the following: a fingerprint, a facial scan, a retinal image, an iris scan, and a voice print.

13. The method of claim 4 further comprising a biometric theft resolution step, wherein the recipient's personal identification number is changed whenever the recipient's biometric sample is determined to have been fraudulently duplicated.

14. A method for processing tokenless electronic reward-units transfer to a recipient using an electronic identicator and at least one recipient biometric sample, comprising;

a. creating an electronic registry of reward units, having the reward-units disbursed to a recipient based upon the occurrence of predetermined criteria;

b. a recipient registration step, wherein the recipient registers with the electronic identicator at least one registration biometric sample;

c. a recipient identification step, wherein the identicator compares a recipient bid biometric sample with at least one previously registered biometric samples for producing either a successful or failed identification of the recipient; and d. recipient reward-units issuance step, wherein upon successful identification of the recipient, an electronic reward transaction is conducted without the recipient using any tokens such as plastic cards or man made portable memory devices such as smart cards, or magnetic stripe cards to receive the rewards units.

15. The method of claim 14 wherein the biometric sample comprises of one of the following: a fingerprint, a facial scan, a retinal image, an iris scan, and a voice print.

16. A device for tokenless transaction of electronic reward-units transfer to a recipient using at least one recipient biometric sample, comprising;

a. an electronic identicator for comparing the bid and registered biometric samples of a recipient of reward units, and for comparing the bid and registration identification data of an issuer of reward units;

b. a party identification apparatus for submission of the recipient's biometric samples and the issuer's identification data;

c. an electronic reward registry of reward units, having the reward-units disbursed to a recipients based upon the occurrence of predetermined criteria;

d. a recipient rewards account for storage of accrued reward units; and e. an execution module for debiting and crediting the recipient reward account based upon the occurrence of predetermined criteria, wherein no man made tokens such as cards or smartcards are presented for the transaction.

17. The device of claim 16 wherein the recipient registers a recipient personal identification number with the electronic identicator, which is used by the electronic identicator to identify the recipient.

18. The device of claim 16 further comprising a rule registry module containing predetermined reward units disbursement instructions.

19. The device of claim 16 further comprising a recipient electronic registry, wherein reward accounts from multiple users are stored within.

20. The device of claim 19, further comprising a demographics data base, wherein volunteered information of the recipient is maintained.

* * * * *

UNITED STATES PATENT AND TRADEMARK OFFICE
CERTIFICATE OF CORRECTION

PATENT NO. : 6,012,039            Page 1 of 1
DATED : January 4, 2000
INVENTOR(S) : Ned Hoffman, David Ferrin Pare, Jr., and Jonathan Alexander Lee It is certified that error appears in the above-identified patent and that said Letters Patent is hereby corrected as shown below:

Column 16,
Line 22, change "issuer's person" to -- recipient's person --.

Signed and Sealed this

Fifth Day of March, 2002

Attest:

JAMES E. ROGAN
*Attesting Officer*     *Director of the United States Patent and Trademark Office*